United States

Jerie

[11] 4,017,145
[5] Apr. 12, 1977

[54] DEVICE MOUNTABLE IN A CRAFT FOR THE RECORDING OF DATA FROM A REMOTE OBJECT

[75] Inventor: Hans Georg Jerie, Enschede, Netherlands

[73] Assignee: Stichting Internationaal Instituut voor Luchtkaartering en Aarkunde (ITC), Enschede, Netherlands

[22] Filed: Apr. 29, 1975

[21] Appl. No.: 572,901

[30] Foreign Application Priority Data

May 9, 1974 Netherlands ............ 7406227

[52] U.S. Cl. .................... 350/7; 250/236
[51] Int. Cl.² .................... G02B 27/17
[58] Field of Search ......... 350/7, 6, 285, 21–24, 350/26; 250/234–236; 354/65, 66, 71, 73, 94, 95, 99, 115; 352/65, 69, 84, 106–111; 178/6.7, 7.6, DIG. 20, 6.8, 6.5

[56] References Cited

UNITED STATES PATENTS

| 2,433,534 | 12/1947 | Sonne | 354/66 |
|---|---|---|---|
| 3,023,662 | 3/1962 | Hicks | 350/7 |
| 3,134,902 | 5/1964 | Chase et al. | 178/DIG. 20 |
| 3,463,070 | 8/1969 | Miller et al. | 354/96 |
| 3,554,628 | 1/1971 | Kennedy | 350/7 |

FOREIGN PATENTS OR APPLICATIONS

| 394,446 | 6/1933 | United Kingdom | 350/6 |
|---|---|---|---|
| 429,690 | 6/1935 | United Kingdom | 178/7.6 |

*Primary Examiner*—John K. Corbin
*Assistant Examiner*—Jon W. Henry
*Attorney, Agent, or Firm*—Spencer & Kaye

[57] ABSTRACT

A device mounted in a craft for recording data from a remote object, such as a scanner or panoramic camera. The main axis of the device is mounted perpendicular to the direction of movement of the craft and the device includes one plane mirror in front of and one plane mirror behind a primary element such as a prism or a mirror rotating about the main axis and oriented at a fixed angle of 45° to the main axis.

3 Claims, 1 Drawing Figure

U.S. Patent        April 12, 1977        4,017,145
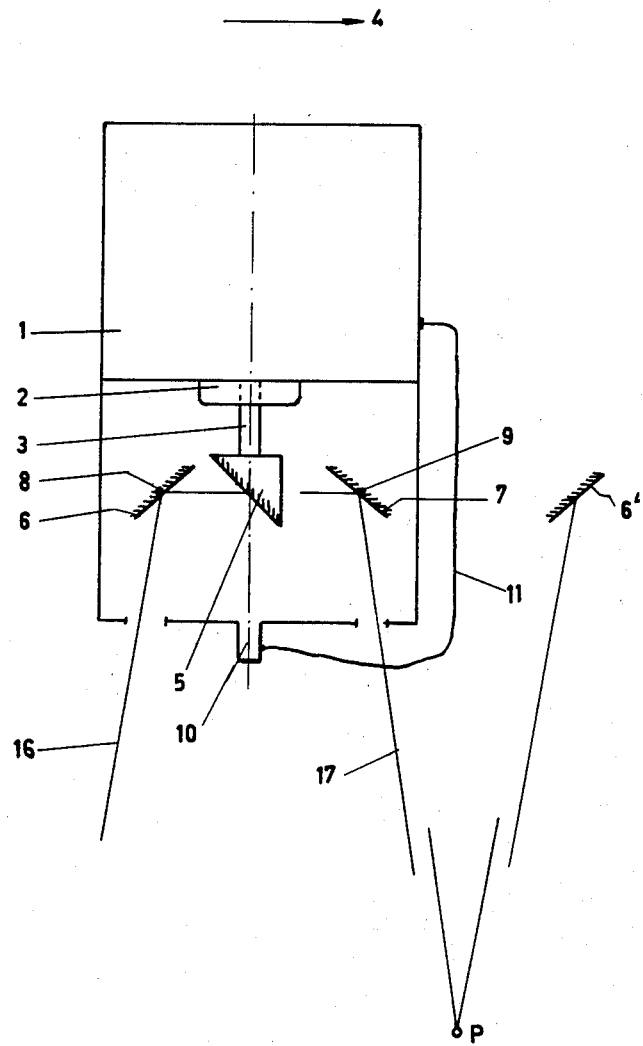

DEVICE MOUNTABLE IN A CRAFT FOR THE RECORDING OF DATA FROM A REMOTE OBJECT

BACKGROUND OF THE INVENTION

The invention relates to a device mounted in a craft, particularly in an aircraft or spacecraft, for recording data from a remote object, such as a part of the earth, or its atmosphere, or of another planet, moon or star, and particularly relates to a device such as a scanner for the production of line, infra-red multi-spectral data or panoramic images.

Devices are known in the art that are equipped with a primary element, such as a prism or mirror that rotates about a main axis and that forms a fixed angle of 45° to that main axis, so that data can be recorded that are essentially situated in a plane perpendicular to the main axis. Generally, these devices are mounted in the craft so that the main axis is parallel to the direction of movement of the craft, causing data to be recorded in planes lying perpendicular to that direction of movement.

In line scanners the received electromagnetic radiation is directed onto a detector and after amplification, if any, is recorded on magnetic tape or is converted into light that is projected on to a secondary element, such as a prism or a mirror that rotates in phase with the primary element, and then recorded on a light-sensitive film.

In multi-spectral scanners, the electromagnetic radiation is directed onto a prism or a grid, and divided into different spectral zones, which are projected onto detectors and from them recorded onto magnetic tape.

In panoramic cameras the image received by the primary rotating element is projected onto light-sensitive film via a secondary element, rotating in phase with the primary element.

With the above devices it is not possible, however, to obtain straight away two sets of data of one and the same point of the object and, to attain this aim, several solutions have been proposed.

One of the solutions is to use two or more devices, whose main axes lie at some distance from each other with, for instance, each axis forming a specific angle with the direction of movement of the craft. This requires at least a doubling of the equipment.

According to another proposal, there are mounted on the main axis two prisms or mirrors that deviate from the angle of 45 degrees, but each, for instance, being at a respective side of the axis. Then receiving is not effected, however, any longer in planes but in conical surfaces, so that additional corrections must be effected.

In a panoramic camera a solution has been proposed in which the whole camera can oscillate about an axis perpendicular to the direction of movement of the craft. So as to generate and control this oscillation a complicated equipment is necessary, which would require a substantial amount of space and energy, and whose action must be compensated synchronously in the image taken up so as to enable elaborating the images in the proper form.

SUMMARY OF THE INVENTION

It is the object of the invention to eliminate such drawbacks and to provide a much simpler solution in order to obtain stereoscopic images or data of an object.

For that purpose, according to the invention, the main axis, preferably, is arranged to be perpendicular to the direction of movement of the craft and the device is equipped with a plane mirror in front of and a plane mirror behind the primary element, at least one of which mirrors does not form an angle of 45° to the main axis. Preferably, both mirrors form an equal angle to the main axis, however, which is greater or smaller than 45°.

In order to be able to change the direction of the recording axes, it is recommended that the angles between the plane mirrors and the main axis be adjustable.

If a compensation would be required for the speed of the craft with respect to the rotational speed of the primary element, it is recommended that according to the invention the mirrors be placed slantingly with respect to the direction of movement of the craft and that, preferably, the slanting position also be adjustable.

BRIEF DESCRIPTION OF THE DRAWING

The single FIGURE is a schematic diagram of an embodiment of the invention, including a primary element and two mirrors.

DESCRIPTION OF THE PREFERRED EMBODIMENT

The FIGURE illustrates, in an aircraft or space-craft, a housing 1 provided with a main rotatable shaft 3 driven by a motor 2. This main shaft represents the main axis of the device for detecting data and is perpendicular to the direction of movement 4 of the craft. At the lower side of this shaft 3, a prism 5 is mounted with a mirrored surface at 45 degrees to the main axis. In front of and behind this prism 5, plane mirrors 6 and 7 are mounted in a manner such that their orientations are adjustable about shafts 8 and 9. If main shaft 3 is vertical with respect to the direction of movement 4, shafts 8 and 9 generally are mounted horizontally and also perpendicular to the direction of movement 4. Mirrors 6 and 7 extend at an angle to main shaft 3 which is greater than 45 degrees. Preferably, the angles are equal to each other, but are oriented differently with respect to main shaft 3.

On the central axis of main shaft 3, underneath rotating prism 5, a radiation detector 10 is mounted and this receives images from each of mirrors 6 and 7 alternately. The radiation received by detector 10 is converted into electric impulses which can be via conductor 11 to an amplifier and furthermore to one or more recording media which are located in housing 1.

In a line scanner the recording medium can be a known magnetic tape or the pulses can be converted in a known way into light which is projected onto a secondary mirror or prism rotating in phase with prism 5 and can be recorded on one or more light-sensitive films.

In multi-spectral scanners the energy collected is divided into zones of different wavelength bands in a manner known in the art and recorded on magnetic tapes. In panoramic cameras, the image taken by rotating prism 5 is projected onto light-sensitive films in a manner known in the art by means of a lens system and a secondary element rotating in phase with prism 5.

The surface of prism 5 which is oriented at 45° to, and which rotates about vertical shaft 3 mainly collects signals from a plane that is normal to main axis represented by shaft 3. Signals from an object observed in planes 16 and 17, which may deviate from a plane through main shaft 3, are collected in the normal plane via mirrors 6 and 7. Distortion can not occur because the signals are presented via a plane and not via a conical surface such as occurs in a panoramic camera with two different prismatic surfaces that deviate from 45° known in the art for double image exposures.

With the device according to the invention, a point P of the object at first is received by mirror 7 when the point is in plane 17 and a moment later this same point P is received on mirror 6 when the craft has moved so that this mirror is in position 6' and recorded again by the device which has moved in the direction of movement of the craft, so that from the two signals collected a stereoscopic observation of point P is obtained.

If a compensation for the speed of the craft must be effected, this is possible in a simple way by mounting shafts 8 and 9 of the mirrors so that, instead of being perpendicular to the direction of movement, their orientation is adjustable in the horizontal plane. This adjustment allows a correlation with the ratio of the speed of the craft and the speed at which prism 5 rotates.

Mirror shafts 8 and 9 then are no longer parallel to each other, but extend at angles to the direction of movement. The angles between the shafts and the direction 4 equal, but extend in respectively different directions, in accordance with the compensation for the resultant of speed of rotation of the primary element and the speed in the direction of movement of the craft.

In an other embodiment according to the invention, main shaft 3 is designed as a hollow shaft and the mirrored surface of prism 5 is so mounted at an angle of 45° to the main shaft that the image is projected into the cavity of shaft 3. Detector 10 then is mounted coaxially with the cavity in housing 1.

It is clear that the device described is mainly intended for recordings of an object such as the earth or an other celestial body or parts of them, taken from an aircraft or space-craft. It can also be applied, however, for oceanography, in which the device is mounted in a vessel or submarine and the bottom of the sea is recorded.

I claim:

1. In a device arranged to record data from a remote object constituted by a surface while being moved in a given direction relative to such surface, the device including a primary element mounted for continuous rotation about a main axis and presenting a radiation reflecting surface oriented at a fixed angle of 45 degrees to the main axis and the main axis being substantially perpendicular to the surface, the improvement wherein said device further comprises a first plane mirror permanently disposed on one side of said main axis a second plane mirror permanently disposed on the opposite side of said main axis, at least one of said mirrors being oriented so that its reflecting surface extends at an angle unequal to 45° to the main axis, and two pivotally mounted mirror support shafts each carrying a respective one of said plane mirrors and each lying in a plane which is perpendicular to the main axis.

2. A device according to claim 1, wherein both said mirrors form equal but oppositely directed angles to the main axis.

3. A device according to claim 1, wherein said shafts are further mounted to be movable in said plane to give said mirrors an orientation which establishes a correlation with the ratio between the rotational speed of said primary element and the speed of said device in the direction of its movement.

* * * * *